United States Patent [19]

Cunningham

[11] 4,333,896
[45] Jun. 8, 1982

[54] METHOD AND APPARATUS FOR EXTRUDING HONEYCOMB STRUCTURES WITH SKINS THEREON INVOLVING THE USE OF AN ADJUSTABLE EXTENSION DIE MASK

[75] Inventor: George M. Cunningham, Horseheads, N.Y.

[73] Assignee: Corning Glass Works, Corning, N.Y.

[21] Appl. No.: 148,791

[22] Filed: May 12, 1980

[51] Int. Cl.³ .................. B28B 21/54; B28C 7/16; B29F 3/04
[52] U.S. Cl. .................. 264/40.5; 264/40.7; 264/177 R; 425/135; 425/145; 425/465; 425/466
[58] Field of Search .............. 425/466, 467, 135, 145, 425/465; 264/40.5, 40.7, 177 R

[56] References Cited
U.S. PATENT DOCUMENTS

| | | | |
|---|---|---|---|
| 3,790,654 | 2/1974 | Bagley | 264/177 |
| 3,836,302 | 9/1974 | Kaukeinen | 425/197 |
| 3,893,792 | 7/1975 | Laczko | 264/40.5 X |
| 3,947,033 | 3/1976 | Cunningham | 425/467 |
| 4,008,033 | 2/1977 | Folmar et al. | 425/467 |
| 4,075,270 | 2/1978 | Cunningham | 264/40.5 X |
| 4,178,145 | 12/1979 | Hamamoto et al. | 425/467 X |

Primary Examiner—Philip Anderson
Attorney, Agent, or Firm—Richard N. Wardell

[57] ABSTRACT

Disclosed is a novel extrusion die mask for use in the extrusion of honeycomb structures. The mask includes a stationary portion with an orifice extending longitudinally therethrough. A movable recess means is provided which forms a recess communicating between the outlet face of an extrusion die and the central orifice which receives and compacts extruded batch material from the die to form the skin of the extruded honeycomb structure. An adjustment means is provided for controlling the depth of the recess whereby the amount of material directed to the skin of the structure may be varied as batch viscosity varies and as product requirements indicate.

11 Claims, 8 Drawing Figures

METHOD AND APPARATUS FOR EXTRUDING HONEYCOMB STRUCTURES WITH SKINS THEREON INVOLVING THE USE OF AN ADJUSTABLE EXTENSION DIE MASK

BACKGROUND OF THE INVENTION

This invention relates to the art of manufacturing extruded articles from extrudable material such as ceramic batches, molten glasses, plastics, molten metals, and similar materials, which have the property of being able to flow or plastically deform during extrusion while being able to become sufficiently rigid immediately thereafter so as to maintain their structural integrity. More particularly, the present invention relates to an improved extrusion die, or alternatively to an improved face plate ring or mask assembly utilized in conjunction with an existing extrusion die for providing such extrusion die with greater versatility.

An extrusion die of the general type with which the present invention is useful is disclosed in U.S. Pat. No. 3,790,654 to R. D. Bagley. Disclosed therein is an extrusion die for making honeycomb structures. However, because the manufacture of such extrusion dies is complex and costly, it is desirable to provide such dies with a face plate or mask overlying a portion of the discharge face thereof so as to permit changing the overall configuration of the extruded product without necessitating the re-machining of the basic extrusion die. Such a face plate or mask is disclosed in U.S. Pat. No. 3,836,302 to R. M. Kaukeinen.

However, regardless of whether an extrusion die is utilized without a mask or face plate as disclosed in the aforementioned Bagley patent, or with a mask or face plate as disclosed in the Kaukeinen patent, it is desirable that some provision be made for improving the skin characteristics about the periphery of the cellular or honeycomb articles which are extruded by the die. Accordingly, U.S. Pat. Nos. 3,947,214 to the present applicant and 4,008,033 to Folmar et al disclose the provision of an annular recess or gap at the outlet face of an extrusion die in the face plate or mask for conrolling the flow of additional batch material to the outer boundaries or skin of an extruded honeycomb article.

While the utilization of an annular recess or gap in a face plate or mask has been generally satisfactory, it is sometimes found that the viscosity of the batch material being extruded may vary from time to time. As the batch material becomes increasingly viscous, it is sometimes determined that the width of the gap is not adequate. Alternatively, if the viscosity of the batch material decreases, the gap width may be excessive. In either case, the extruded skin of the finished honeycomb structure may be deleteriously effected. In such instances, it is generally necessary to cease the batch extrusion of certain honeycomb or cellular products, while a new mask, having the proper recess depth or gap width is obtained. Moreover, even if the viscosity of the batch material being processed remains constant, it may be desirable to increase or decrease the skin thickness of an extruded honeycomb structure depending upon the desired structural rigidity requirements and thermal shock requirements of the finished article. It would be desirable to provide a means for adapting an extrusion die mask to accommodate varying batch viscosities and varying product requirements.

SUMMARY OF THE INVENTION

It is an object of the present invention to provide an extrusion die with a means for varying the skin wall thickness of honeycombed articles extruded therefrom.

It is a further object of the present invention to provide an extrusion die with a means for varying the skin wall thickness of articles extruded therefrom without the necessity of providing a plurality of face plate or mask assembly means.

These and other objects of the present invention are achieved in one embodiment by means of a novel extrusion die mask for use in combination with an extrusion die, the die having an inlet face and an outlet face with a plurality of feed passageways therebetween. The mask includes a stationary portion which may have a blocking surface for blocking selected portions of the outlet face of the extrusion die. The mask is provided with an orifice extending longitudinally through the mask for receiving extruded honeycomb structures. However, in accordance with the present invention, a moveable recess means is provided which extends about the periphery of the mask orifice and adjustment means are provided which cooperate with the recess means to control the depth of the recess as batch viscosity or product requirements indicate. In accordance with the preferred embodiment of the present invention, threads are provided between the adjustment means and the stationary portion of the mask for effecting the relative movement therebetween, which movement is coupled to the recess means so that the depth of the recess may be controlled. In another embodiment, the recess means and adjustment means are an integral body.

In another embodiment of the present invention an extrusion die body having an inlet face and an outlet face includes an orifice extending about the periphery of the outlet face through which the skin or sheath of a honeycomb structure is extruded. An adjustment means is provided at the outlet face for varying the quantity of extrudate passing through the orifice so as to permit variations in the skin thickness of the extruded article as required by varying batch viscosities and product requirements.

These and other objects of the present invention will be more fully appreciated by reference to the accompanying drawings in which:

DETAILED DESCRIPTION OF PREFERRED EMBODIMENT

Figure 1:
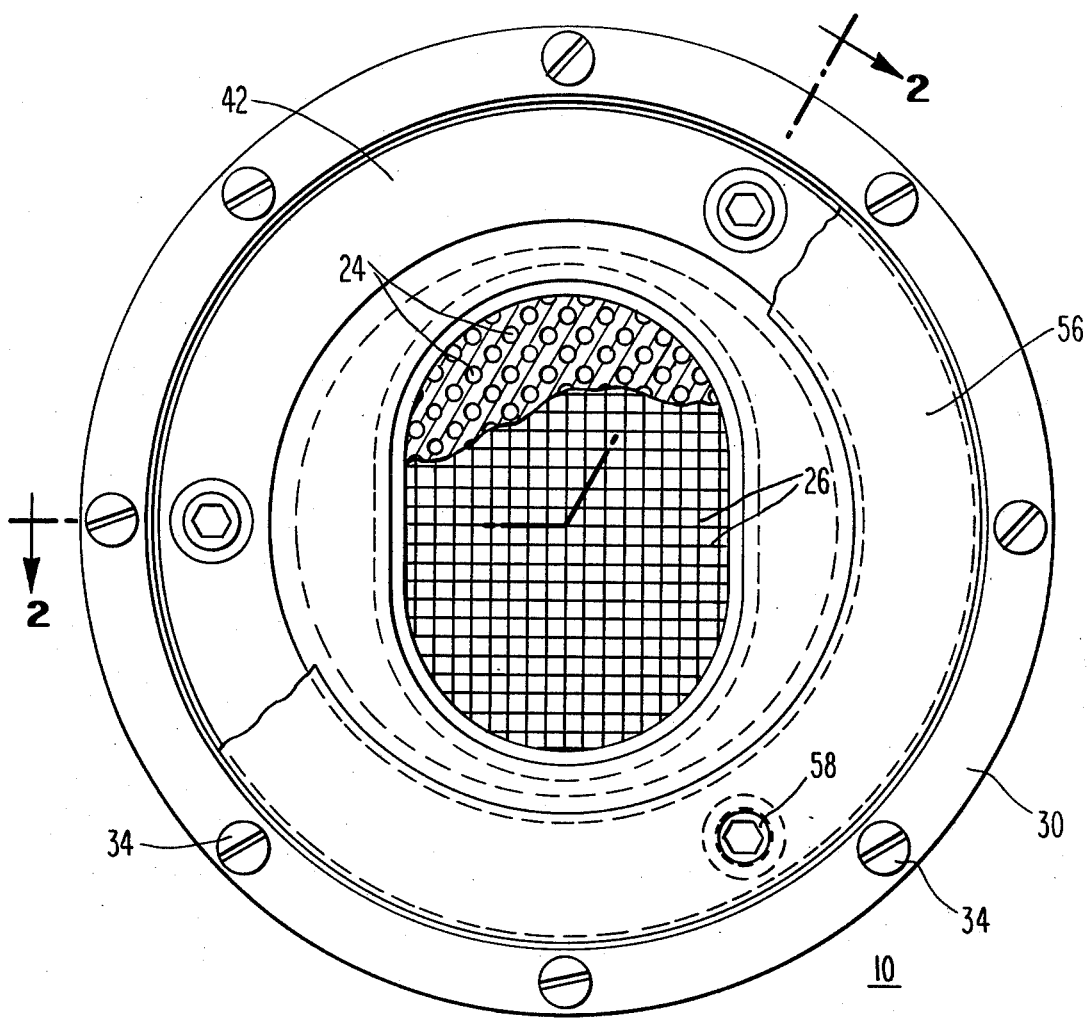
FIG. 1 is a bottom plan view of an extrusion die and mask assembly illustrating one embodiment of the present invention.
Figure 2A:
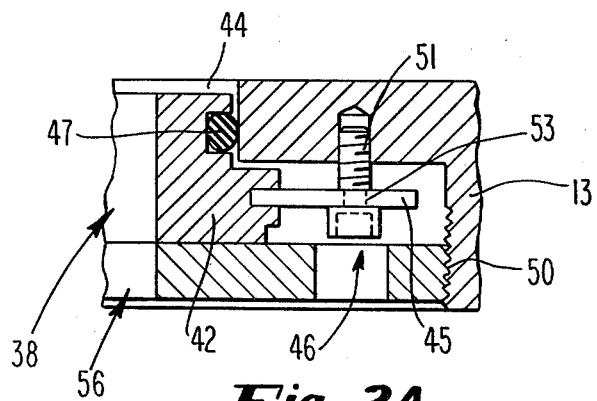
FIG. 2A is a partial cross-sectional view of a mask, modified in one respect from that shown in FIGS. 1 and 2.
Figure 2:
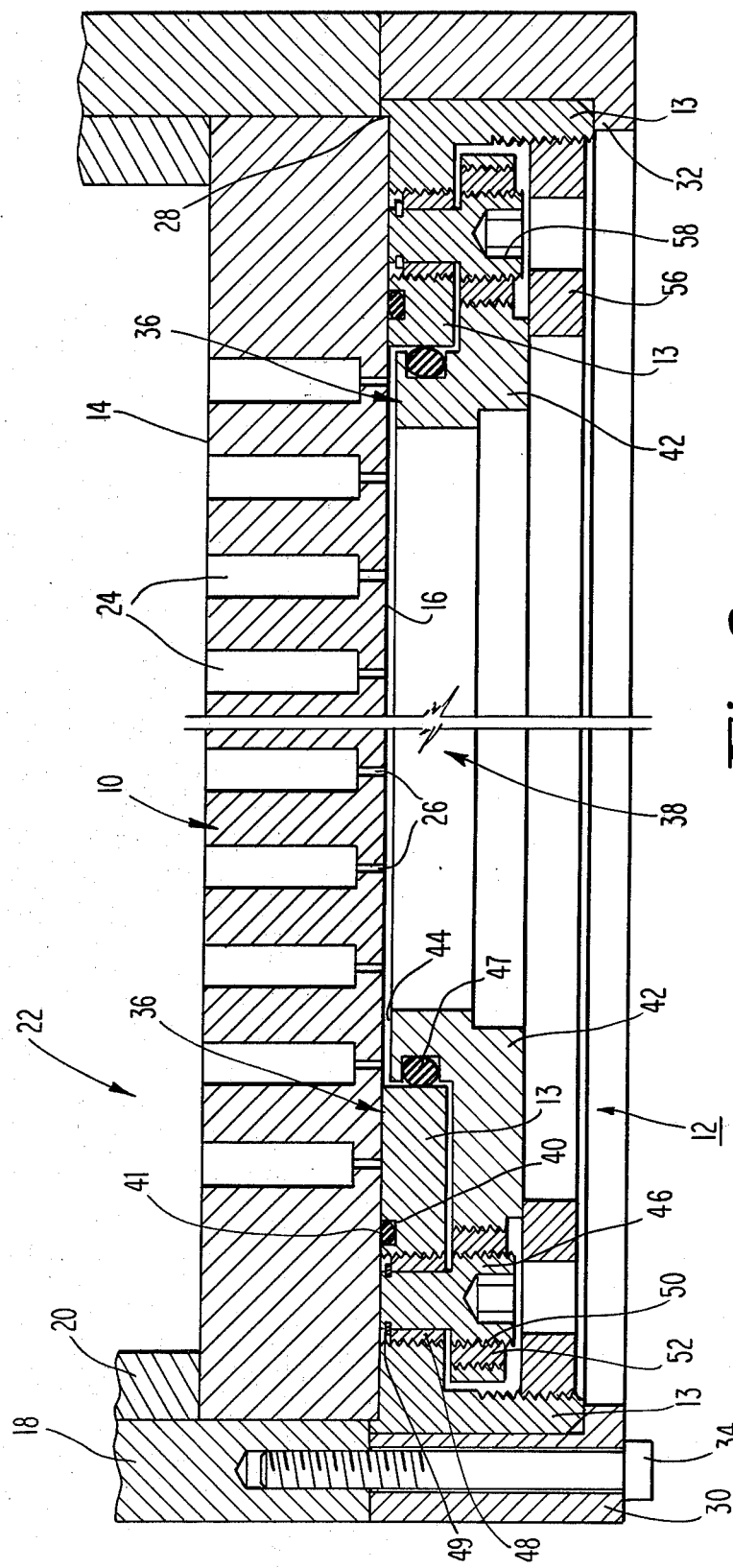
FIG. 2 is a cross-sectional view of the extrusion die and mask assembly taken along line 2—2 of FIG. 1.

Referring to FIGS. 1 and 2, an extrusion die body 10 with a face plate or mask structure 12 in accordance with the present invention will be seen. The die body 10 includes an inlet face 14 and an outlet face 16. The die body 10 is situated in a support structure 18 which retains the die body 10 and a cylinder 20. The interior of the cylinder 20 forms an extrusion chamber 22 for retaining batch material or extrudate therein. The die body 10 includes a plurality of feed passageways 24 communicating with a plurality of discharge slots 26. Extrudate is forced by pressure from the extrusion chamber 22 through the feed passageways 24 and discharged from the discharge slots 26 to form a honeycomb structure.

However, in accordance with the aforementioned Kaukeinen patent, the outlet face 16 of the die body 10 is provided with an extrusion mask or face plate 12. The mask or face plate 12 has an aligning recess 28 therein for receiving the die body 10. The mask or face plate 12 is retained in an abutting relationship with the die body 10 by means of a retaining ring 30 having a lip 32 surrounding the periphery thereof. The retaining ring 30 is held in an abutting relationship with the support structure 18 by means of cap screws 34. The mask or face plate 12 includes a stationary portion 13 which is retained in a fixed, abutting relationship with the die body 10. This stationary portion 13 may include a blocking surface 36 for blocking off selected portions of the outlet face 16 of the die body 10 so as to preclude extrudate from passing through certain feed passageways 24 and discharge slots 26. Other feed passageways and discharge slots communicate with a central opening or orifice 38, which extends longitudinally through the mask 12 for receiving the extruded honeycomb structures emanating from the unblocked discharge slots 26.

To preclude extrudate from the unblocked discharge slots 26 from extending radially, the stationary portion 13 of the mask 12 includes an annular depression 40 for retaining an O-ring 41 therein which sealingly engages the outlet face 16 of the die body 10.

In accordance with the present invention, the extrusion die mask 12 also includes a moveable recess means 42 extending about the periphery of the central orifice 38. The shape of the central orifice 38 defines the shape of the extruded product. The recess means 42 is situated adjacent the blocking surface 36. While it may abut the outlet face 16 of the mask 12, the recess means 42 may also be spaced therefrom so as to provide a communicating gap 44 between certain of the discharge slots and the central orifice 38. Extrudate is received and compacted in the gap 44 and directed to the orifice 38 to form the outer skin of the extruded honeycomb structure. Extrudate received in the gap 44 is directed to the central orifice 38 and is precluded from passing between the recess means 42 and the stationary portion 13 of the mask by means of an O-ring 47. In accordance with the present invention, the depth of the recess, i.e., the width of gap 44 between the moveable recess means 42 and the outlet face 16 of the die body 10, is controllable by means of an adjustment means 46.

As shown in FIG. 2, the adjustment means 46 is precluded from linear movement relative to the mask 12 but is freely rotatable with respect thereto. A collar 46 is situated in the stationary portion 13 of the mask or face plate 12. The adjustment means 48 is situated in the bore of the collar 48 and is freely rotatable in the bore. The adjustment means 46 is retained in the bore by a retaining ring 49. The adjustment means also includes threads 50 which cooperate with an internal threaded bushing 52 which is fixed to the moveable recess means 42. Rotation of the adjustment means 46 thus causes the recess means 42 to be moved either toward or away from the outlet face 16 of the die body 10 in order that the depth of the recess may be controlled. Moreover, the depth of the recess 44 may be easily varied to accommodate changes in the viscosity of the batch material situated in the extrusion chamber 22. In practice, the recess 44 may be varied, for example, from 0.00762 to 0.1524 cm.

Rotation of the adjustment means 46 is accomplished by means of depression 58 which mates with, for example, a suitable wrench, not shown.

Once an appropriate recess depth 44 has been selected, in the preferred embodiment, a thrust plate 56 is mounted to the mask 12 to preclude unwanted movement of the recess means 42.

In the embodiment shown in FIGS. 1 and 2, the adjustment means 46 is fixed by retaining ring 49 to preclude linear movement between it and the stationary portion 13 of the mask 12. However, rotation of the adjustment means 46 is permitted within the bore of the collar 48 which causes relative movement between the stationary portion 13 of the die 12 and the recess means 42.

Referring now to FIG. 2A, another embodiment of the adjustment means shown in FIGS. 1 and 2 may be seen wherein the adjustment means 46 is fixed relative to the recess means 42 but moveable with respect to stationary portion 13 of the mask 12. In the embodiment shown in FIG. 2A, the adjustment means 46 includes a tongue 45 which is fixed to the recess means 42. The tongue 45 has an aperture 53 therein. A threaded means 51 is provided which is rotatable within the aperture 53 whereby rotation of the threaded means 51 causes the tongue 45 to move relative to the stationary portion 13 of the mask 12 and to thereby move the recess means 42 which adjusts the depth of the recess 44.

It will be appreciated that the extrusion mask 12 of FIGS. 1 and 2 need not be, and is not shown as being a round mask.

Figure 3:
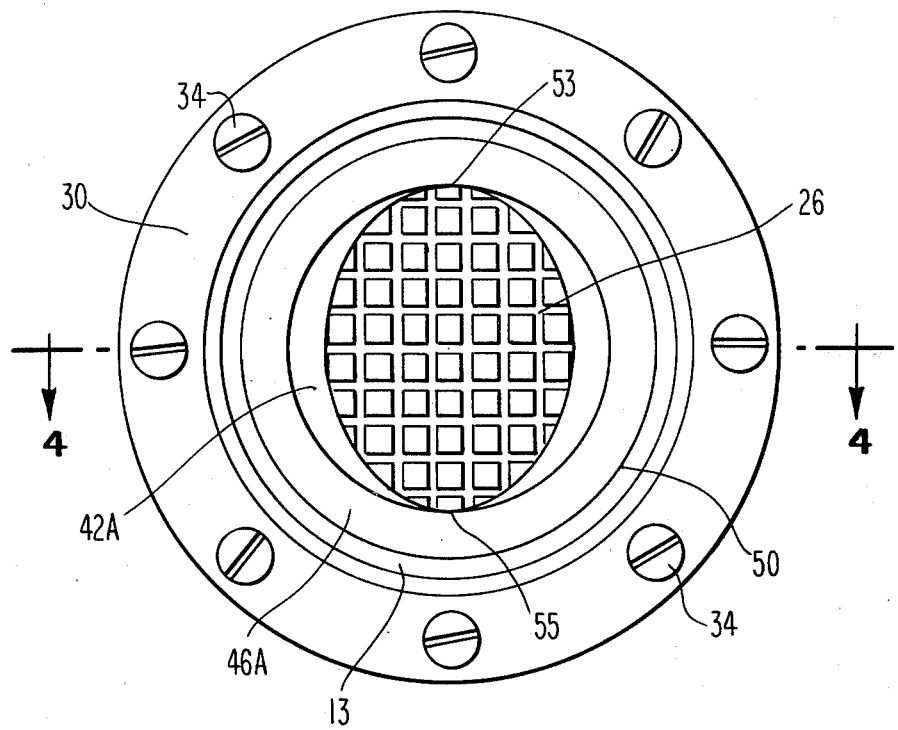
FIG. 3 is a bottom plan view of an extrusion die and mask assembly illustrating another embodiment of the present invention.
Figure 4:
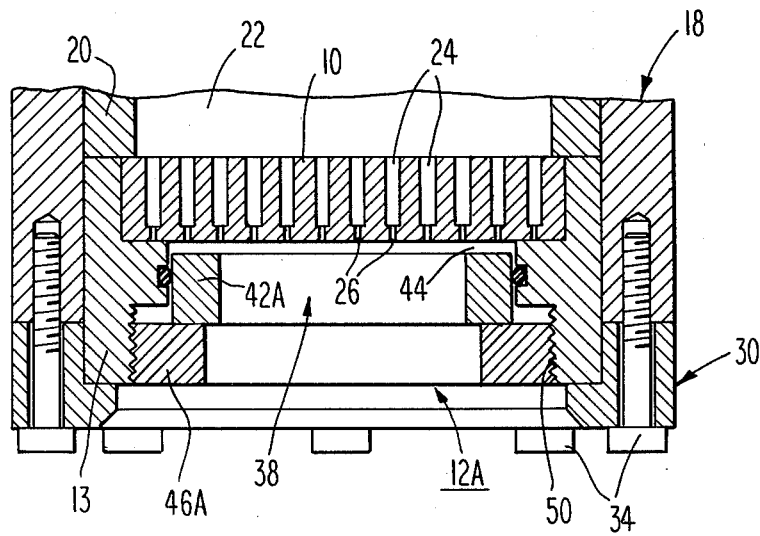
FIG. 4 is a cross sectional view of the die and mask assembly shown in FIG. 3 taken along lines 4—4.

Referring now to FIGS. 3 and 4, another embodiment of an extrusion die utilized with a mask which is non-round is disclosed. In the embodiments shown in FIGS. 3 and 4, as well as those shown in subsequent figures, like numerals are used to describe to like components illustrated in FIGS. 1 and 2. Accordingly, a die body 10 is shown having feed passageways 24 and discharge slots 26. A support structure 18 is provided for retaining a mask shown generally at 12A in abutting relationship with the die body 10 by means of a retaining ring 30 secured by cap screws 34. Like the embodiment shown in FIGS. 1 and 2, the mask assembly also includes a stationary portion 13 and a central opening or orifice 38 for receiving an extruded honeycomb structure. Moreover, the mask 12A shown in FIGS. 3 and 4 includes a recess means 42A which is shaped in accordance with the same general configuration as the central orifice 38. In the embodiment shown in FIGS. 3 and 4 an oval mask 12A and an oval recess means 42A are shown. However, in accordance with the embodiment shown in FIGS. 3 and 4, an annular adjustment means 46A is disclosed which, although circular, is in flush abutting relationship with the recess means 42A at points 53 and 55 as shown. The adjustment means 46A is threadedly engaged with the stationary portion 13 of the mask 12A whereby rotation of the adjustment means 46A causes relative movement between the adjustment means and the stationary portion 13 of the mask 12A. Since the adjustment means 46A abuts recess means 42A, the motion of the adjustment means 46A is coupled to the recess means 42A so as to vary the depth of the recess or gap 44 between the recess means 42A and the outlet surface of the die body 10.

Figure 5:
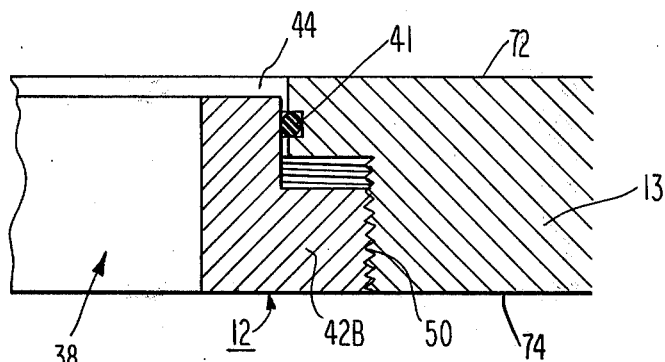
FIGS. 5 and 6 are partial, cross-sectional views of extrusion die masks modified in accordance with still other embodiments of the present invention.

In the situation in which the mask 12 is a round structure, a simplified arrangement may be employed from that shown in FIGS. 1-4, the simplified embodiment being shown in FIG. 5. FIG. 5 discloses a mask shown generally at 12 having a surface 72 which abuts the outlet face of an extrusion die (not shown). The mask 12 includes a stationary portion 13 which surrounds a central opening or orifice 38. In accordance with the present invention, the mask 12 includes an integral recess and adjustment means 42B which is annular and which extends about the periphery of the orifice 38. Threads 50 are provided between the stationary portion 13 and the integral recess and adjustment means 42B to effect relative movement therebetween so as to vary the gap 44 between the recess means 42B and the outlet face of an extrusion die. Preferably, an O-ring 41, is provided to prevent the seepage of extrudate between the integral recess/adjustment means 42B and the stationary portion 13 of the mask 12.

While not shown in FIG. 5, it is desirable to provide reference marks on the outlet face 74 of the mask 12 as well as adjustment means 42B such that the angular position of these members and thus the depth of the recess 44 may be easily determined.

Figure 6:
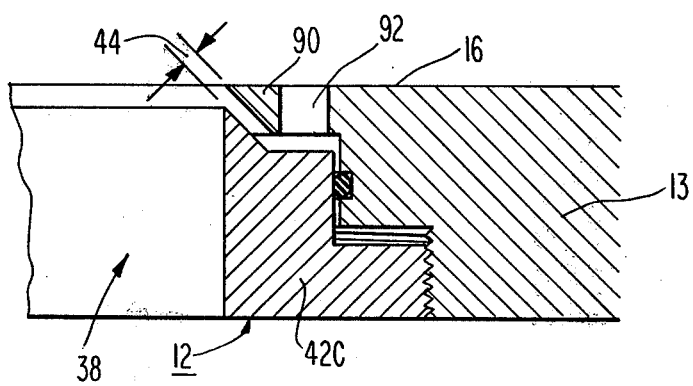

Referring now to FIG. 6, still another embodiment of the present invention may be seen wherein a mask 12 is provided with an lip 90 extending about the periphery of the central orifice 38. The lip 90 has a plurality of apertures 92 situated around the circumference thereof. The apertures 92 communicate with the outlet face 16 of an extrusion die (not shown) and with a gap 44 which opens to the orifice 38. An integral recess forming and adjusting means 42C is provided which engages the stationary portion 13 of the mask 12. Rotation of the integral recess and adjustment means 42C causes a variation in the width or depth of the gap 44 as shown.

Figure 7:
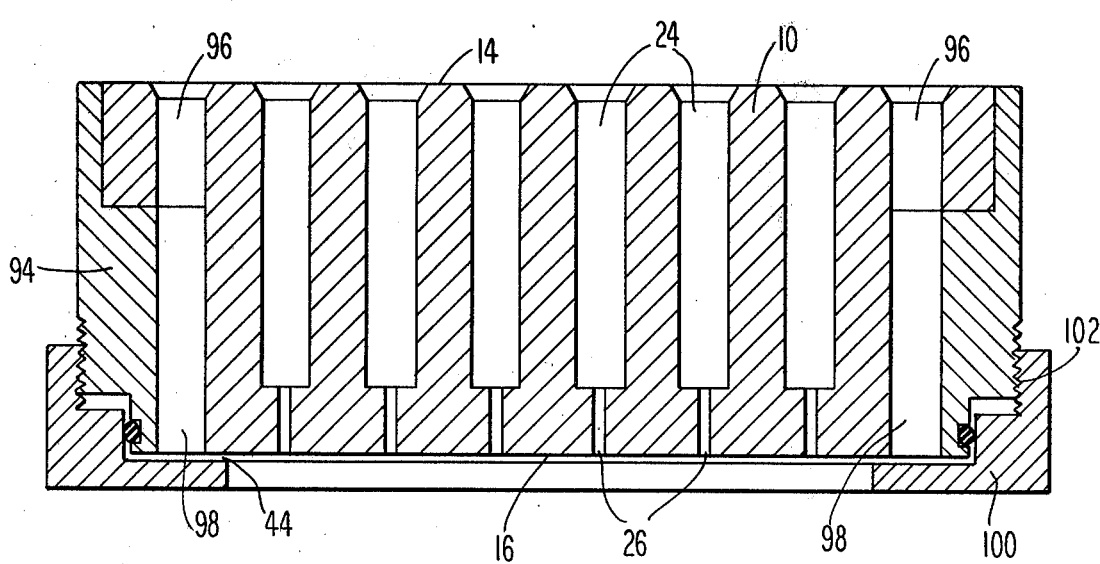
FIG. 7 is an extrusion die assembly modified in accordance with the present invention.

Referring now to FIG. 7, still another embodiment of the present invention will be described.

FIG. 7 discloses an extrusion die body 10. However, unlike the embodiments shown in FIGS. 1-6, the die body 10 does not include a mask or face plate held thereon by another separate component. Instead, the die body 10 is situated in and suitably fastened to a collar 94 such as disclosed in the aforementioned Bagley patent. The die body 10 has a plurality of feed passageways 24 extending from the inlet face 14 of the die body and communicating with a plurality of discharge slots 26 which open to the outlet face 16 of the die body 10. Extending circumferentially about the feed passageways 24 are a plurality of skin forming passageways 96 which communicate with an annular orifice 98 extending about the periphery of the outlet face and formed between the die body 10 and the collar 94. Extrudate forced through the feed passageways 24 forms the core of the extruded honeycomb structure, while extrudate forced through the skin forming passageways 96 as well as the annular orifice 98 forms the skin of the resultant structure. In accordance with the present invention, an adjustment means 100 is provided which partially blocks the annular orifice 98 at the outlet face 16 to form recess or gap 44 therebetween. Threads 102 are provided such that rotation of the adjustment means 100 varies the width of the gap 44 so as to vary the quantity of the extrudate passing through the annular orifice 98 at the outlet face 16. In this manner, the skin thickness of the resulting honeycomb structure may be varied as the viscosity of the batch material varies. Thus, means 100 also serves as a moveable recess or gap means comparable to means 42 in FIG. 2.

While a particular embodiment has been shown and described, it will be apparent to those skilled in the art that various changes and modifications may be made without departing from the spirit and scope of the present invention as defined by the appended claims.

What is claimed is:

1. A method of extruding honeycomb structures with skins thereon and comprising the steps of:

extruding material through a die means having an inlet face and an outlet face and a plurality of passageways for said material extending therebetween so as to form honeycomb structures thereform;

passing said structures emanating from the passageways of the central portion of said outlet face through an orifice in a mask adjacent a peripheral portion of said outlet face, simultaneously passing said structures or a separate portion of said material from the passageways of the peripheral portion of said outlet face into a recess between said mask and said outlet face, compacting such structures or material in the recess into a skin-forming mass, delivering said mass from the recess to the periphery of said orifice and forming said mass into skins on said structures passing through said orifice, the depth of said recess being controllable and capable of being varied during extrusion;

monitoring the viscosity of said material passing through said die and mask; and varying the depth of said recess in response to changes in said viscosity during extrusion of said material through the die means and into and through said mask.

2. An extrusion die mask for use in combination with a die means for forming honeycomb structures, said die means having an inlet face and an outlet face and a plurality of passageways for extrudable material extending therebetween, which mask is in part for forming skins on said structures and comprises:

a stationary portion adapted for location in a fixed position with respect to a peripheral portion of said outlet face;

an orifice extending longitudinally through said stationary means for receiving and passing said structures therethrough from a central portion of said outlet face;

moveable recess means extending about the periphery of said orifice and for forming a recess between said recess means and an opposed portion of said outlet face surrounding said central portion, said recess communicating between said passageways in said opposed portion and said orifice, which recess receives and compacts extruded material from said passageways in said opposed portion to form the skins of said structures, the depth of said recess being controllable and capable of being varied; and adjustment means coupled to said recess means and to said stationary portion for positioning and moving said recess means so as to respectively control and vary the depth of said recess.

3. The extrusion die mask of claim 1 further comprising:
threads cooperating between said adjustment means and said stationary portion for effecting the relative movement between said recess means and said stationary portion whereby the depth of said recess is controlled and varied.

4. The extrusion die mask of claim 1 wherein said adjustment means and said recess means are integral with one another.

5. The extrusion die mask of claim 3 wherein said adjustment means is linearly moveable relative to said stationary portion.

6. The extrusion die mask of claim 3 wherein said adjustment means is fixed from linear movement relative to said stationary portion and wherein said recess means is linearly moveable relative to said adjustment means.

7. The extrusion die mask of claim 1 wherein said orifice, said adjustment means and said recess means are all round.

8. The extrusion die mask of claim 1 wherein said orifice and said recess means are non-round and wherein said adjustment means is round.

9. An extrusion apparatus comprising:
a die means for forming honeycomb structures, said die means having an inlet face and an outlet face and a plurality of passageways for extrudable material extending therebetween; and
combined adjustment means and moveable gap means coupled to a peripheral portion of said die means for forming a gap between said gap means and an opposed peripheral portion of said outlet face and for positioning and moving said combined means so as to respectively control and vary the depth of said gap, said combined means having an orifice extending therethrough for receiving and passing said structures through said orifice from a central portion of said outlet face, said gap communicating between said passageways in said opposed peripheral portion and said orifice, which gap receives and compacts extruded material from said passageways in said opposed peripheral portion to form the skins of said structures.

10. The extrusion apparatus of claim 9 further comprising:
threads cooperating between said adjustment means and said die means for effecting relative movement therebetween.

11. An extrusion apparatus comprising:
a die means for forming honeycomb structures, said die means having an inlet face and an outlet face and a plurality of passageways for extrudable material extending therebetween; and
adjustable skin forming means including
a central orifice for receiving said extruded honeycomb structures emanating from a central portion of said outlet face;
moveable recess means extending about the periphery of said orifice and for forming a recess between said recess means and an opposed portion of said outlet face surrounding said central portion, said recess communicating between said passageways in said opposed portion and said orifice, which recess receives and compacts extruded material from said passageways in said opposed portion to form the skins of said structures; and
adjustment means coupled to said recess means for positioning and moving said recess means so as to respectively control and vary the depth of said recess.

* * * * *